United States Patent [19]

Wood

[11] 4,397,485
[45] Aug. 9, 1983

[54] THREADLESS PIPE FITTING

[75] Inventor: Sherman L. Wood, Horton, Mich.

[73] Assignee: Aeroquip Corporation, Jackson, Mich.

[21] Appl. No.: 226,376

[22] Filed: Jan. 19, 1981

Related U.S. Application Data

[63] Continuation-in-part of Ser. No. 64,554, Aug. 8, 1979, abandoned.

[51] Int. Cl.³ .............................................. F16L 17/02
[52] U.S. Cl. ..................................... 285/111; 285/4; 285/369; 285/404
[58] Field of Search ................... 285/111, 404, 4, 110, 285/111, 112, 230, 231, 369; 277/207 A, 205

[56] References Cited

U.S. PATENT DOCUMENTS

| | | | |
|---|---|---|---|
| 1,982,441 | 11/1934 | Loweke | 285/111 |
| 3,123,367 | 3/1964 | Brummer et al. | 277/205 X |
| 3,137,509 | 6/1964 | Kazienko | 285/110 X |
| 3,601,419 | 8/1971 | Fern | 277/205 |
| 3,684,317 | 8/1972 | Kazienko | 285/110 |
| 3,879,067 | 4/1975 | Keyser | 285/110 |
| 4,073,514 | 2/1978 | Pate | 285/423 X |
| 4,157,195 | 6/1979 | Costanzo | 285/4 |
| 4,165,892 | 8/1979 | Piatek | 285/111 |

FOREIGN PATENT DOCUMENTS

| | | | |
|---|---|---|---|
| 1226634 | 2/1960 | France | 285/111 |
| 6508182 | 6/1965 | Netherlands | 285/110 |
| 1165431 | 10/1969 | United Kingdom | 285/111 |

OTHER PUBLICATIONS

Plate I of 2/4/76–Pipe fitting manufactured by Michigan Hanger Company, Inc. of Hubbard, Ohio.

*Primary Examiner*—Dave W. Arola
*Attorney, Agent, or Firm*—Beaman & Beaman

[57] ABSTRACT

A threadless pipe fitting of the "stab-in" type wherein a fluid tight connection between a cylindrical conduit and fitting is achieved merely by inserting the fitting upon the conduit end. An annular elastomeric seal within a groove defined in the fitting conduit receiving bore engages the conduit outer surface in a combination compression and lip seal manner wherein both elastomeric compression forces and fluid pressure forces maintain a sealing engagement between the seal and conduit. Additionally, set screw means radially threaded into the fitting mechanically maintain the conduit and fitting assembly, and the set screw includes torque limiting means for preventing excessive radial forces, and the nose of the set screw means is shaped to provide maximum frictional engagement with the conduit with minimal radial force.

6 Claims, 6 Drawing Figures

THREADLESS PIPE FITTING

BACKGROUND OF THE INVENTION

This application is a continuation-in-part of Ser. No. 06/064,554 filed Aug. 8, 1979, now abandoned.

It is known to interconnect cylindrical conduits and fittings in a fluid tight manner by the use of sealing rings. Such sealing rings may be of the compression type, such as an O-ring, or may be a lip sealing type wherein fluid pressures acting upon seal lips hold the seal in engagement with the conduit exterior surface. However, if effective compression or lip seal efficienices are to be achieved it is usually required that the conduit exterior surface be accurately finished and to be free of irregularities and surface imperfections requiring secondary machining, or expensive conduit manufacturing techniques.

In fittings of the aforementioned type, high compression forces can be achieved by dimensioning the internal diameter of the seal considerably smaller than the outer diameter of the conduit whereby significant deformation and compression of the seal takes place upon the conduit being inserted into the fitting. While such high seal compressive forces increase the efficiency of the seal with conduits having surface irregularities, difficulties are often encountered in inserting conduits into fittings having such undersized seals, and the conduit may exert such high axial forces on the seal during insertion that the seal may be pushed or rolled out of its fitting groove.

Likewise, with lip seals, the design of the seal due to the desire to produce a definable lip may so weaken the seal structure that the seal is damaged during the insertion of the conduit, and, as described above, an undersized lip seal may create problems during the insertion of the conduit due to the axial forces imposed upon the seal during assembly.

Additionally, it is known to utilize set screws to maintain the assembly of fittings and threadless conduits, such set screws being used to maintain the conduit within the fitting upon the conduit being fully inserted into the fitting bore. Conventionally, set screws utilize a square or hexagonal outer end or head whereby a wrench may be utilized to rotate the set screw, and it is not uncommon for the operator to impose excessive torque on the set screw causing the set screw to radially deform or crush the conduit a slight degree destroying the fluid tight seal desired between the conduit and fitting.

It is an object of the invention to provide a fitting for use with threadless conduit wherein an effective fluid tight seal is accomplished between a fitting and standard run conduit whose exterior surface has not been specially machined.

A further object of the invention is to provide a fitting for threadless conduit wherein the conduit may be readily inserted into a fitting bore without axially displacing an elastomer seal within the bore, and yet an effective fluid tight seal is established between the fitting and conduit by means of the seal.

A further object of the invention is to provide a fitting for threadless conduit utilizing an elastomeric seal ring wherein both seal compression and lip deformation is utilized to maintain the seal in engagement with the conduit outer surface.

Additionally, an object of the invention is to provide a fitting for threadless conduit utilizing an elastomeric sealing ring wherein the forces maintaining engagement of the seal with the conduit are concentrated at the conduit and wherein internal seal forces are maximized to provide high sealing efficiencies.

Further, an object of the invention is to provide a fitting for threadless conduit utilizing a set screw for maintaining the conduit fitting assembly, and wherein torque limiting means are defined on the set screw to prevent collapse or damage to the conduit.

In the practice of the invention the fitting includes a cylindrical bore for closely receiving cylindrical conduit. A stop is located in the fitting bore for determining maximum insertion of the conduit into the fitting, and at least one threaded set screw mounted on the fitting engages the external surface of the conduit to maintain the assembly. The set screw is provided with a torque producing head which is connected to the set screw body by a reduced diameter stem constituting a frangible component sensitive to predetermined torque whereby the head will twist from the set screw upon a predetermined torque being applied thereto. Further, the set screw end engaging the conduit is provided with a sharp annular edge which embeds into the conduit with minimal axial force to produce an effective frictional engagement therewith to resist conduit withdrawal with respect to the fitting.

Internally, the fitting bore includes an annular groove which receives an elastomeric seal ring. This seal ring includes an innermost configuration defining a lip of substantial relative dimension. In the relaxed state the lip includes a tip which is in alignment with a primary portion of the seal body material, and yet, the lip is capable of being radially deformed in the usual manner as the conduit enters the fitting bore.

The lip includes inner surfaces engaged by the forward end of the conduit as it is inserted into the fitting bore, and such seal ring surface are so shaped as to facilitate conduit insertion, and during the later stages of conduit placement the lip surfaces concentrate the forces existing in the seal ring due to seal deformation at the tip of the seal lip. The configuration of the lip is such that deformation thereof by the conduit does not produce interference with the primary seal body portion, and the lip configuration resists "roll out" or other adverse characteristics during conduit insertion.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
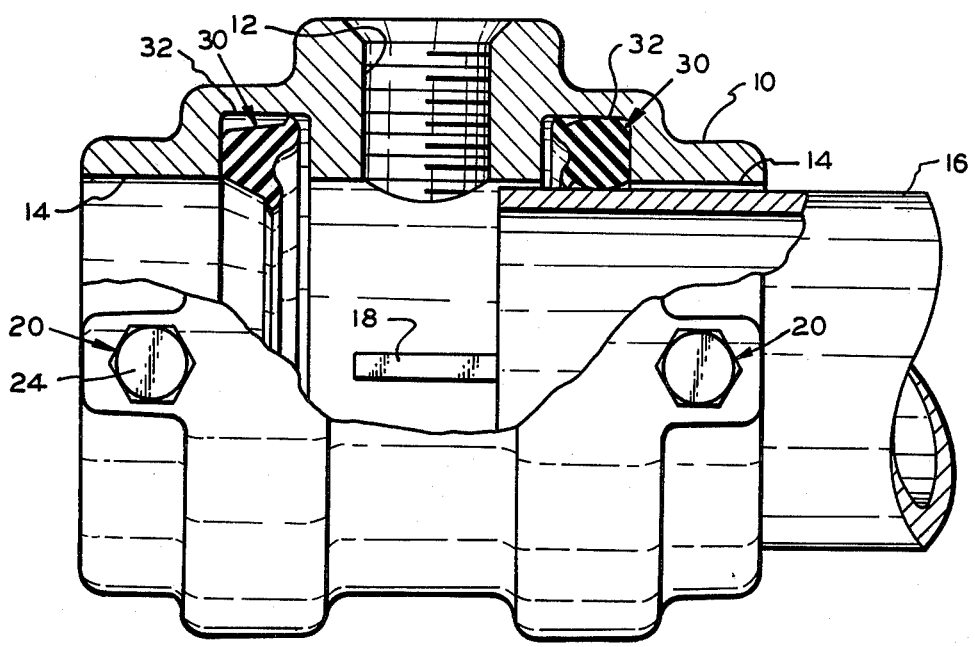
FIG. 1 is an elevational view of a fitting in accord with the invention, partially in diametrical section, a conduit being associated with the fitting at the right half thereof, and the seal being shown in the relaxed state at the left side of the figure.
Figure 2:
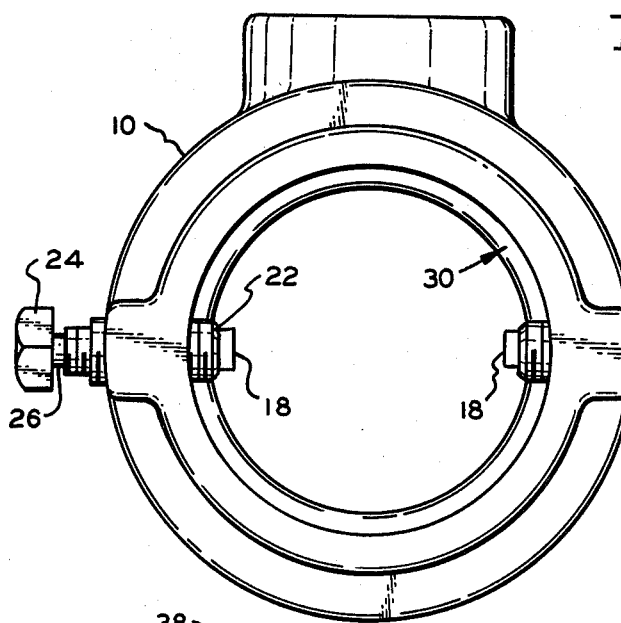
FIG. 2 is an elevational view of the fitting as taken from the left of FIG. 1.
Figure 5:
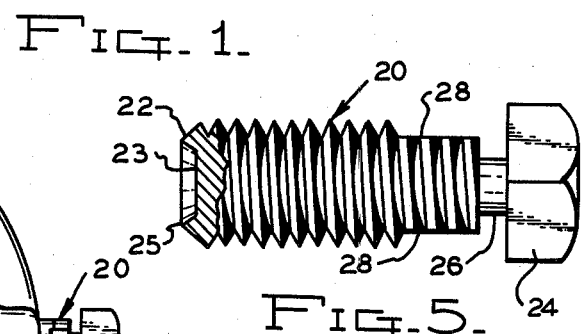
FIG. 5 is an elevational partially sectioned view of a set screw in accord with the inventive concept.
Figure 6:
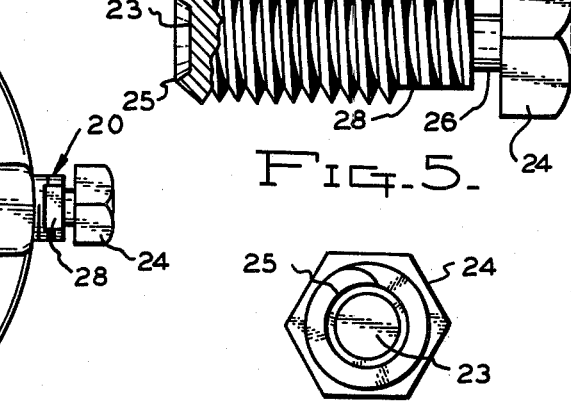
FIG. 6 is an elevational end view of FIG. 5 as taken from the left end thereof.

A fitting in accord with the invention may take any of the conventional forms as used with conduits and plumbing. For instance, the fittings may take the form of couplings, tees, elbows, flanges, or the like, and in FIG. 1 a tee type fitting is shown at 10 having a threaded radial port 12 for receiving a sprinkler, not shown. Threadless conduit is widely used in fire protection sprinkling systems installed in buildings, and the fitting 10 is typical of such fittings as used with sprinkler systems wherein the fitting includes a central cylindrical bore 14 intersecting each fitting end, and intersected by the threaded port 12. The bore 14 is of slightly greater diameter than the conduit 16 which is to be inserted into the bore, and a pair of stops 18 are homogeneously defined within the bore 14 for engagement by the end of the conduits to limit conduit insertion into the bore, as will be appreciated from FIG. 1.

Assembly of the conduits, or conduit, with the fitting is maintained by a pair of set screws 20 engaging each conduit. The set screws are located on diametrically opposite sides of the bore 14 and are received within threaded bores defined in the fitting body. The set screws 20 are formed with a conical and recessed end 22 which includes recess 23 which forms a sharp annular edge 25 which is capable of bitting into the exterior surface of the engaged conduit. At the outer end, the set screws are provided with a hexagonal head 24 which is connected to the set screw threaded portion by means of a reduced diameter frangible stem 26 which is of such a diameter as to shear or twist off upon a predetermined torque being applied to the head. Additionally, the threaded portion is provided with wrench receiving flats 28 upon opposite sides thereof which permits the set screw to be removed, or backed from the engaged conduit, after the head 24 has been sheared from the set screw.

Thus, the operator rotates the set screws 20 by means of a wrench attached to the set screw head 24 and upon engagement of the set screw inner end 22 with the conduit resistance to set screw rotation will cause the torque applied to the head to exceed the ability of the stem 26 to transmit such torque causing the stem to fracture thereby limiting the torque that may be applied to the set screw. The operator will rotate the set screw until the head fractures from the threaded portion, and thus the operator is assured that sufficient torque has been applied to achieve a proper connection between conduit and fitting.

The use of the frangible stem 26 permits the fittings to be visually inspected for application of proper torque to the set screws 20, and when it is desired to remove a set screw a wrench applied to flats 28 readily accomplishes this purpose. If desired, the flats 28 may be omitted as sufficient threads are accessible for griping with pliers or the like whereby the set screws can be rotated for release from the conduit 16.

The sealing between the conduit and fitting is accomplished by means of annular elastomeric seal 30 formed of Nitrile or similar elastomer. The seal 30 is located within an annular groove 32 of rectangular configuration defined in the fitting and intersecting the bore 14 as will be appreciated from FIGS. 1 and 3. The groove 32 consists of an inner radial wall 34, and outer radial wall 36, and a cylindrical base wall 38 perpendicularly intersecting the groove radial walls and concentric with the axis of the bore 14.

Figure 3:
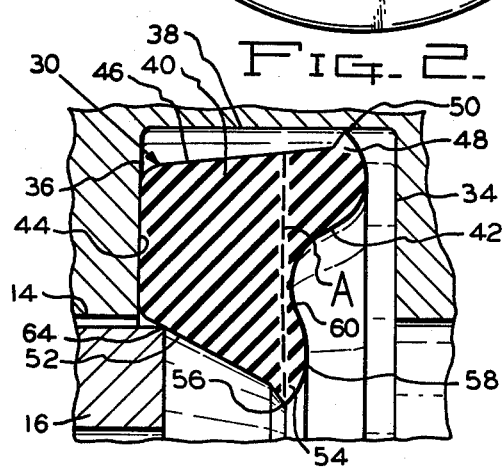
FIG. 3 is an enlarged, diametrical, sectional view of a seal in accord with the invention, while in the relaxed state.

The seal 30 includes a primary body portion 40 having an inner radial face 42 and an outer radial face 44 which, in the relaxed or unstressed condition, are located in opposed, parallel relationship to the walls 34 and 36, respectively as will be appreciated from FIG. 3. The outer form of the seal is primarily defined by a base face consisting of conical surface 46 which is obliquely related to the fitting bore axis and engages lip seal portion 48 having a sharp annular apex 50.

The seal 30 includes a conical conduit engaging compression surface 52 which intersects outer face 44, and the surface 52 intersects lip seal portion 54 which includes annular sharp apex 56. The portion 54 includes a bulbous surface 58 and concave surface 60, FIG. 3, aids to define the lip portion 54 on the seal body. It will be noted that the recess 62 defined by the surface 60 is of a concave configuration of relatively great dimension with respect to the radial dimension of the seal assuring that the lip portion 54 will have clearance in a radial direction during deformation as produced by the conduit 16.

FIG. 3 illustrates the relationship of the seal in the relaxed or uncompressed condition, and illustrates the initial engagement of the conduit leading edge 64 with the seal surface 52, the surface 52 constituting a cam surface for the lip portion 54. It is to be noted that in the relaxed condition the apex 56 is in radial alignment with a major portion of the seal material as indicated by the dotted line A, and this relationship is of significance in that this radial alignment of seal material with the tip produces relatively high seal compression forces with undersized conduits.

As the conduit 16 is inserted into the fitting bore 14 the conduit edge 64 "slides" along the seal surface 52 deforming the lip portion 54 radially outwardly, and as the conduit edge moves over the seal surface 52 the lip portion is forced radially outwardly in view of the angular conical relationship of the seal surface 52 to the axis of the fitting bore.

Figure 4:
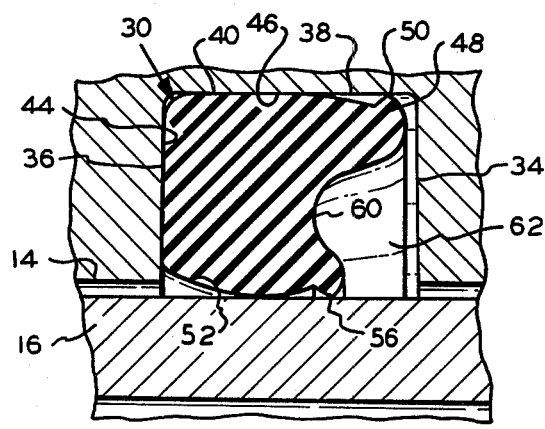
FIG. 4 is a view similar to FIG. 3 illustrating the configuration of the seal when fully engaging a conduit.

The relationship of the seal and conduit when the conduit is fully inserted into the fitting and engages the stop 18 is shown in FIG. 4, and in this relationship the seal surface 52 will be engaging the outer surface of the conduit to produce a compression seal, while the lip portion 54 will be deformed as shown in FIG. 4 wherein the apex 56 will be firmly engaging the conduit outer surface. Due to the fact that the apex 56 is of a sharp configuration the unit pressure of the elastomer of the seal 30 on the conduit will be high insuring an effective sealed relationship with the conduit even if the conduit outer surface is not accurately finished. The use of the sharp apex 56 permits effective sealing with conduits having relatively rough or irregular exterior surfaces, and the combination of compression and lip sealing functions between the seal 30 and the conduit 16 produces effective sealing within the tolerance range of the conduit.

As will be appreciated from FIG. 4, the seal surface 46 will be forced into a tight compressed relationship with the groove surface 38, and lip seal 48 will produce an effective lip seal relationship with the surface 38 due to the engagement of the apex 50 therewith. Also, as will be appreciated from FIG. 4, the seal surface 40 will be in firm engagement with groove surface 36.

As will be apparent from FIG. 4, the clearance provided between the lip portion 54 and the body portion 40 by the configuration of the surface 60 permits the lip portion 54 to freely deform without interference, and also permits fluid pressure to fully engage the lip portion area for providing maximum sealing forces.

The internal compression within the seal body 30 will vary in accord with the diameter of the conduit 16 as the tolerances of the conduit 16 vary. Thus, where the conduit is of the minimum permissible tolerance diameter sealing between the conduit and fitting due to compression of the seal is most effective due to compression, and the lip seal function of lip seal 54 is not as critical as in those cases where the conduit maximum permissible tolerance diameter occurs and the compression relationship between the seal and conduit is not as great.

The use of the sharp edge 25 at the end of the set screw 20 permits an effective frictional engagement between the set screws and the conduit with a minimum of radial force on the conduit. As the edge 25 embeds into the conduit material a positive interconnection between the set screw and conduit is produced which effectively resists axial translation of the conduit relative to the fitting, and the diameter of the reduced portion 26 can be minimized to permit the head 24 to fracture from the threaded shank well before the set screw imposes such radial forces on the conduit 16 as to cause the conduit to begin to collapse.

It is appreciated that various modifications to the inventive concepts may be apparent to those skilled in the art without departing from the spirit and scope of the invention.

What is claimed is:

1. A threadless pipe fitting comprising, in combination, a fitting body having a cylindrical bore having an axis adapted to receive a cylindrical conduit, an annular sealing surface defined on said body concentric to said axis communicating with said bore, an annular elastomeric combination compression and lip seal having an axis and engaging said sealing surface and adapted to be compressed between said sealing surface and the conduit inserted into said bore, said seal comprising an elastomeric body having axially spaced inner and outer faces, a base face concentric to and facing away from said seal axis and a conduit engaging face concentric to and disposed toward said seal axis, a first annular lip portion defined in said seal body having a relatively sharp annular apex located adjacent said seal inner face and extending toward said seal axis radially inwardly of said conduit engaging face in the normal noncompressed seal state, the radial thickness of said seal body at said seal apex being uninterrupted to support said apex under radial compression forces and the radial thickness of said seal body increasing in the axial direction from said seal outer face toward said apex whereby the normal seal radial thickness at said outer face is less than the radial distance from said body sealing surface to a conduit within said bore at said seal outer face and the radial thickness at the intersection of said conduit engaging face and lip portion is greater than the distance from said body sealing surface to a conduit within said bore at said intersection whereby insertion of a conduit within said bore radially compresses said seal compression sealing said seal base face against said body sealing surface and said seal conduit engaging face against the conduit and said lip portion apex firmly engages the conduit.

2. In a threadless pipe fitting as in claim 1, wherein said seal conduit engaging face is of a conical configuration converging toward said seal axis in the direction from said outer face toward said inner face.

3. In a threadless pipe fitting as in claim 2 wherein said seal inner face includes an annular axial extension adjacent said apex partially defining said lip portion.

4. In a threadless pipe fitting as in claim 2, said seal base face comprising a conical surface converging in the direction from said inner face to said outer face.

5. In a threadless pipe fitting as in claim 1, a second annular tip portion defined on said seal body adjacent said base face and inner face having an annular apex radially extending away from said seal axis in the seal normal state.

6. An elastomer seal ring for a threadless pipe fitting comprising an annular body having an axis, axially spaced inner and outer face, a conical base face concentric to and facing away from said seal axis and a conical conduit engaging face concentric to and disposed toward said seal axis, a first annular lip portion of limited axial dimension defined on said seal body having a relatively sharp annular apex located adjacent said seal inner face and radially extending toward said seal axis radially inwardly of said conical conduit engaging face in the normal noncompressed seal state, the radial thickness of said seal body at said seal apex being uninterrupted to support said apex under radial compression forces and the radial thickness of said seal body increasing in the axial direction from said seal outer face toward said apex, said seal conduit engaging face converging toward said seal axis in the direction from said outer face toward said inner face, a second annular lip portion of limited axial dimension defined on said seal body adjacent said base face and inner face having an annular relatively sharp apex radially extending away from said seal axis and conical base face in the seal normal state.

* * * * *